United States Patent [19]

Kuppenheimer, Jr. et al.

[11] 4,225,782
[45] Sep. 30, 1980

[54] WIDE FIELD OF VIEW-NARROW BAND DETECTION SYSTEM

[75] Inventors: John D. Kuppenheimer, Jr., Tewksbury; Paul F. Murphy, Medford, both of Mass.

[73] Assignee: Sanders Associates, Inc., Nashua, N.H.

[21] Appl. No.: 933,315

[22] Filed: Aug. 14, 1978

[51] Int. Cl.$^2$ ............................................. G01J 3/46
[52] U.S. Cl. ................................... 250/216; 250/226; 350/293; 356/416
[58] Field of Search ...................... 250/216, 226, 228; 350/96.16, 163, 166, 293, 296; 356/416

[56] References Cited

U.S. PATENT DOCUMENTS

| | | | |
|---|---|---|---|
| 3,756,688 | 9/1973 | Hudson et al. | 350/96.16 |
| 3,761,184 | 9/1973 | McLaughlin | 356/416 |
| 3,937,560 | 2/1976 | Milton | 350/96.16 |
| 3,963,308 | 6/1976 | Lebduska | 350/96.16 X |

Primary Examiner—David C. Nelms
Assistant Examiner—Darwin R. Hostetter
Attorney, Agent, or Firm—Louis Etlinger; Richard I. Seligman

[57] ABSTRACT

A wide field of view-narrow band detection system including a radiation responsive member and optical filter is provided by employing optimal angle cones to simultaneously control field of view, throughput and angles impinging on the optical filter.

13 Claims, 5 Drawing Figures

WIDE FIELD OF VIEW-NARROW BAND DETECTION SYSTEM

BACKGROUND OF THE INVENTION

This invention relates to radiation detection systems and more particularly to radiation detection systems having a wide field of view and narrowband (or sharp cut-on or cutoff) detection requirements.

In many applications it is desirable or even necessary to provide a detection system which looks into a very large field of view. This may be because of an inherent desire to have large fields of view or it may be so that the received signals are relatively independent of the angular position of the detectors. In such applications the usual solution is to provide a bare detector staring into the world. A flat plate detector looks into two $\pi$ steradians.

In many of these systems it is also a desired characteristic to minimize the band of frequencies incident on the detector, usually to enhance signal to noise ratio. To provide minimum bandwidth an interference filter is conventionally placed over the detector. This, however, can create problems in wide field of view systems. For example, when an interference filter is used in conjunction with a detector for wide field of view systems, the filtering characteristics of the filter change depending on the angle of incidence of radiation incident on the filter. When the angle of incidence of the radiation impinging on the filter changes from the normal, the wave amplitude at the boundary of the interfering wave changes, thereby changing the filtering characteristics of the filter, such as a shift in bandpass, or a shift of the bandedge.

The transmission qualities of the filter are thus shifted as a function of the impingement angle, the angle between that of the incident radiation and a line normal to the detector surface. The peak transmission of the filter is shifted as a function of the impingement angle, and the total transmission is decreased as the impingement angle grows larger. Therefore, the use of interference filters in a wide field of view system becomes a problem. The problem is further increased when the system is to operate over a varying temperature range, since filtering properties of the filter also change with temperature.

In order to overcome these problems, particularly the use of interference filters in wide field of view systems, several solutions have been used in the past. The simplest solution is to provide more than one flat detector. This is shown in FIGS. 1A and 1B of the drawings. In FIG. 1A two detectors 10 and 12 are provided; and in FIG. 1B three detectors 14, 16, and 18 are provided. For this solution it is seen that as one wishes to increase the field of view of the system several detector surfaces are required. Of course, this is both expensive and complex. Furthermore, these sytems have the problem that seams between the detectors must be made exceedingly small to avoid field gaps.

Another solution is to use a curved detector. However, this is exceedingly difficult to provide from a manufacturing viewpoint, as well as expensive.

SUMMARY OF THE INVENTION

Accordingly, it is an object of this invention to provide an improved radiation detection system.

It is another object of this invention to provide an improved radiation detection system having a wide field of view and narrow passband (or sharp, cut-on, cutoff edge).

It is a further object of this invention to provide an improved radiation detection system of the above type in which the shift in bandpass and bandedge response of the system is minimized for radiation arriving at the system at large acceptance angles.

Briefly, the objects of this invention are achieved by using optimal angle converting cones looking into a wide field of view and controlling the ray angle incident on an interference filter to some desired maximum impingement angle.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENT

The preferred embodiment of this invention makes use of a well known optical cone condensor as described in an article by R. Winston in the Journal of The Optical Society of America, Vol. 60, No. 2, on Page 245. This article describes a cone which is capable of receiving energy from a narrow field of view at the larger opening thereof and concentrating it (increasing the irradiance) at the expense of impingement angle of incidence on a detector. By Fermat's principle it is known that if such a cone is inverted and the detector placed at the wide end thereof, the process is reversed so that the cone now accepts rays all the way out to a 90° acceptance angle. Further, the cone causes such rays to impinge on the detector at relatively small impingement angles. All rays falling on the detector come either directly from the field being observed or with only a single reflection off the interior cone surface. This maximum one bounce precludes surface reflectivity of the cone from becoming a problem, since a minimum amount of the radiation is lost through absorption on the surface of the reflector. Such a system is illustrated in FIG. 2 of the drawings.

Figure 1A:
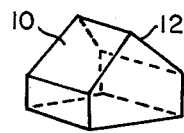
FIGS. 1A and 1B are perspective views of prior art wide field of view, narrowband detection systems.
Figure 1B:
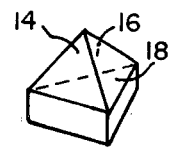
Figure 2:
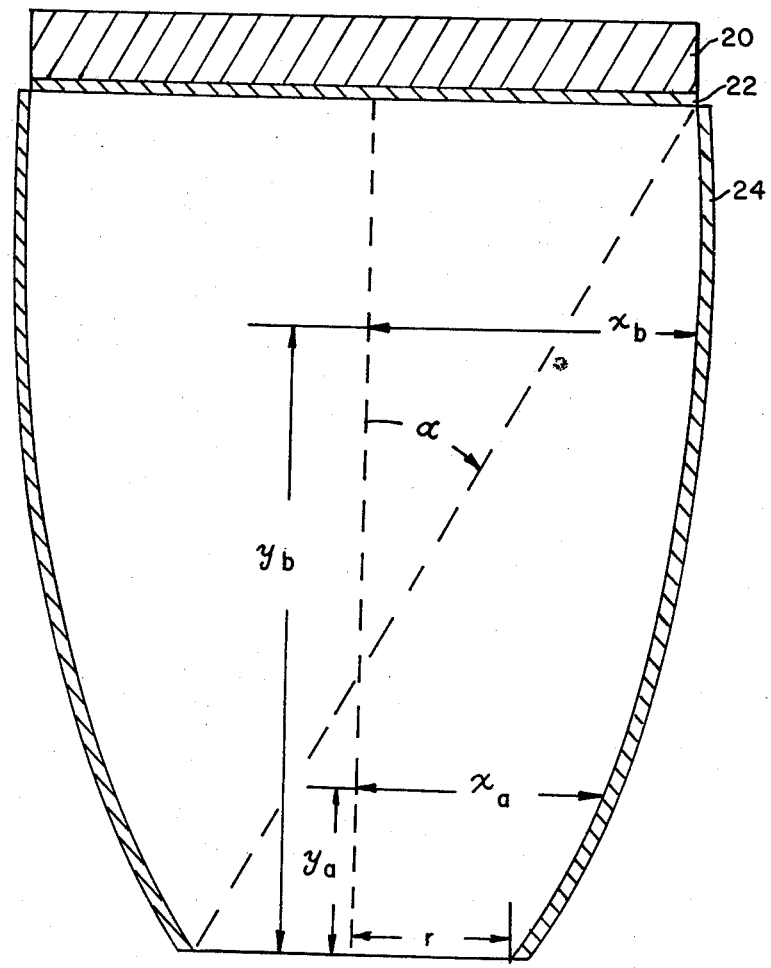
FIG. 2 is a cross-sectional view of an embodiment of the invention.

This detection system employs a detector 20 having on the top surface thereof an interference filter 22. The term interference filter is used in its broadest sense and includes all interferometrically filtering devices including interference filters, etalons, interferometers, etc. A cone 24 is employed to apply radiation to the filter surface. It is seen that by employing this cone, the impingement angle for radiation on the interference filter is greatly minimized compared to the 90° impingement angle for flat plate detectors alone. In this embodiment cone 22 is configured according to the formula $$x = \frac{y\sin\alpha\cos\alpha + 2r\sin\alpha(1 + \sin\alpha) - 2\sqrt{ry(1 + \sin\alpha)\cos\alpha + r^2(1 + \sin\alpha)^2}}{\cos^2\alpha} + r$$

where
- x is the distance from the optical axis to the surface of the cone;
- y is the distance along the axis of the cone starting at the small end;
- $\alpha$ equals the maximum impingement angle; and
- r equals the radius of the small end of the cone.

r, $\alpha$ and two points (a and b) for x and y are shown on FIG. 2.

Employing such a cone fulfills the objects of a wide field of view-narrow band detection system in that energy is collected from a full hemisphere and placed on a detector while keeping the radiation impinging on the detector within the confines of impingement angles suitable for the interference filter.

In one embodiment cone 24 was constructed of electrodeposited nickel and coated with gold. However, the cones could be made otherwise, for example, cast of plastic or metal. Actually any method of producing optically smooth walls with good conformity to the master is suitable. The inner surface can be polished if the original molding is not smooth enough. It can be plated with gold, silver or aluminum, etc., or dielectric coated if that is deemed necessary for particular applications.

Figure 3:
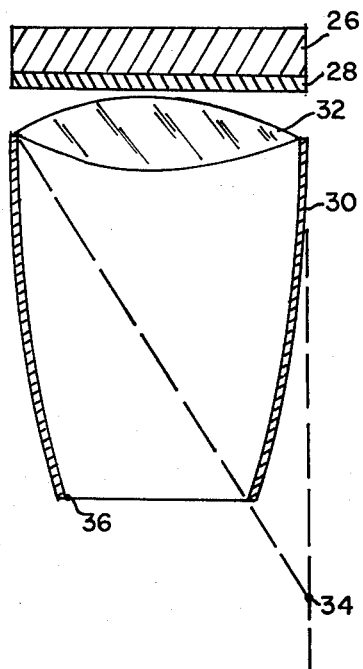
FIG. 3 is a cross-sectional view of another embodiment of the invention.

For some applications, where it is desired to obtain small impingement angles, the cone may be too long in accordance with the above teachings. This can be remedied by using the embodiment of FIG. 3. This embodiment employs a detector 26, a filter 28, and a cone 30. It also employs a lens 32, intermediate filter 28, and collecting cone 30. In this embodiment, the parameters of the collection cone 30 differ from that of the embodiment of FIG. 2. In this embodiment the cone wall is a hyperbola (displaced and rotated about the center line as opposed to a parabola in the FIG. 2 embodiment) which has one foci 34 at the place where the rays from the lens would impinge if there were no cone, and a second foci at the opposite side 36 of the entrance rim of cone 30.

Figure 4:
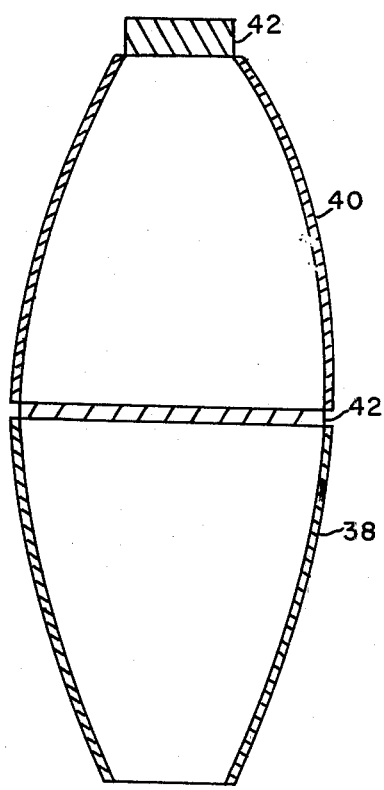
FIG. 4 is a cross-sectional view of a further embodiment of the invention.

Another embodiment of the invention is illustrated in FIG. 4 of the drawings. This embodiment is employed when it is desired to provide large fields of view, but where only very small detectors can be used. In this embodiment two back-to-back cones 38 and 40 are employed with a detector 42 at the small end of cone 40 and an interference filter 42 provided between cones 38 and 40. The cones 38 and 40 in this embodiment are configured like the cone 24 of FIG. 2.

Although the systems described show detectors, any radiation responsive member may be used instead as, for example, television cameras, photomultiplier tubes, photographic film, and even human eyeballs. Thus, it is to be understood that the embodiments shown are to be regarded as illustrative only and that many variations and modifications can be made without departing from the principles of the invention herein disclosed and defined by the appended claims.

We claim:

1. A wide field of view-narrow band detection system, comprising:
   a radiation responsive member;
   an interference filter disposed on said radiation responsive member to filter any radiation applied to said member; and
   an angle converting cone arranged adjacent said interference filter to simultaneously control the field of view, throughput and angles impinging on said interference filter, said angle converting cone being open at both ends with the larger of the two ends adjacent said interference filter.

2. The detection system of claim 1, wherein said cone impinges entering radiation on said interference filter at impingement angles of no more than a predetermined angle.

3. The detection system of claim 1, wherein the smaller of two ends accepts radiation out to a ninety degrees impingement angle.

4. The detection system of claim 1, wherein said angle converting cone is characterized by the formula $$x = \frac{y\sin\alpha\cos\alpha + 2r\sin\alpha(1 + \sin\alpha) - 2\sqrt{ry(1 + \sin\alpha)\cos\alpha + r^2(1 + \sin\alpha)^2}}{\cos^2\alpha} + r$$

where
- x is the distance from the optical axis of the cone to the surface of the cone,
- y is the distance along the axis of the cone starting at the smaller end,
- $\alpha$ is the maximum impingement angle of radiation impinging on the filter, and
- r is the radius of the smaller end of the cone.

5. A wide field of view-narrow band detection system, comprising:
   a radiation responsive member;
   an interference filter disposed on said radiation responsive member to filter any radiation applied to said member; and
   an angle converting cone having an entrance rim and an exit rim, said angle converting cone constructed so as to image the entrance rim of the cone onto the exit rim of the cone.

6. The detection system of claim 5, wherein said angle converting cone is characterized by the formula $$x = \frac{y\sin\alpha\cos\alpha + 2r\sin\alpha(1 + \sin\alpha) - 2\sqrt{ry(1 + \sin\alpha)\cos\alpha + r^2(1 + \sin\alpha)^2}}{\cos^2\alpha} + r$$

where
- x is the distance from the optical axis of the cone to the surface of the cone,
- y is the distance along the axis of the cone starting at the entrance rim, α is the maximum impingement angle of radiation impinging on the filter, and r is the radius of the entrance rim of the cone.

7. A wide field of view-narrow band detection system, comprising:
   a radiation responsive member;
   an interference filter disposed on said radiation responsive member to filter any radiation applied to said member; and
   an angle converting cone arranged adjacent said interference filter to simultaneously control the field of view, throughput and angles impinging on said interference filter, said angle converting cone constructed so as to apply all radiation entering said cone to said interference filter with a maximum of one reflection off the sides of said cone.

8. A wide field of view-narrow band detection system, comprising:
   a radiation responsive member;
   an interference filter disposed on said radiation responsive member to filter any radiation applied to said member;
   an angle converting cone having an entrance rim and an exit rim arranged to receive rays at said entrance rim and apply same to said filter; and
   a lens intermediate said angle converting cone and said filter.

9. The detection system of claim 8, wherein said cone is a hyperbola rotated about an axis not passing through one of its foci, but through the center of its displaced system.

10. The detection system of claim 9, wherein said hyperbola has one foci at the place where the rays from said lens would impinge absent said cone and a second foci at the opposite side of the entrance rim of said cone.

11. A wide field of view-narrow band detection system, comprising:
    a radiation responsive member;
    a first angle converting cone having an entrance rim for receiving radiation to be applied to said radiation responsive member at a larger exit rim;
    a second angle converting cone having an entrance rim for receiving radiation from said first angle converting cone and a smaller exit rim, said radiation responsive member disposed adjacent said exit rim; and
    an interference filter disposed intermediate said exit rim of said first angle converting cone and said entrance rim of said second angle converting cone.

12. The detection system of claim 11, wherein said first angle converting cone is characterized by the formula $$x_1 = \frac{y_1 \sin\alpha_1 \cos\alpha_1 + 2r_1 \sin\alpha_1(1 + \sin\alpha_1) - 2\sqrt{r_1 y_1(1 + \sin\alpha_1)\cos\alpha_1 + r_1^2(1 + \sin\alpha_1)^2}}{\cos^2\alpha_1} + r_1$$

where
$x_1$ is the distance from the optical axis of the cone to the surface of the cone,
$y_1$ is the distance along the axis of the cone starting at the entrance rim,
$\alpha_1$ is the maximum angle of impingement on the filter, and
$r_1$ is the radius of the entrance rim of the cone.

13. The detection system of claim 12, wherein said second angle converting cone is characterized by the formula $$x_2 = \frac{y_2 \sin\alpha_2 \cos\alpha_2 + 2r_2 \sin\alpha_2(1 + \sin\alpha_2) - 2\sqrt{r_2 y_2(1 + \sin\alpha_2)\cos\alpha_2 + r_2^2(1 + \sin\alpha_2)^2}}{\cos^2\alpha_2} + r_2$$

where
$x_2$ is the distance from the optical axis of the cone to the surface of the cone,
$y_2$ is the distance along the axis of the cone starting at the exit rim,
$\alpha_2$ is the maximum acceptance angle of the cone, and
$r_2$ is the radius of the exit rim of the cone.

* * * * *